No. 869,215. PATENTED OCT. 22, 1907.
J. C. ROSS.
IMPLEMENT HANDLE.
APPLICATION FILED FEB. 9, 1906. RENEWED SEPT. 25, 1907.
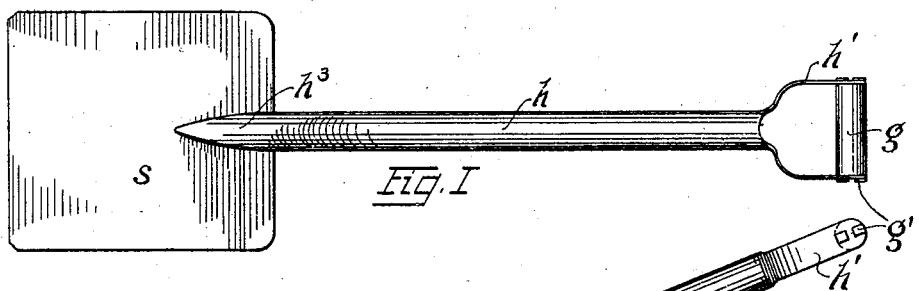
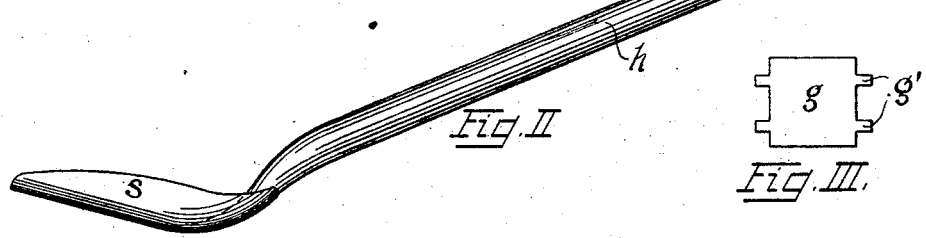
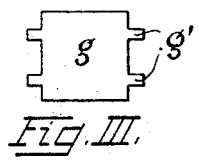
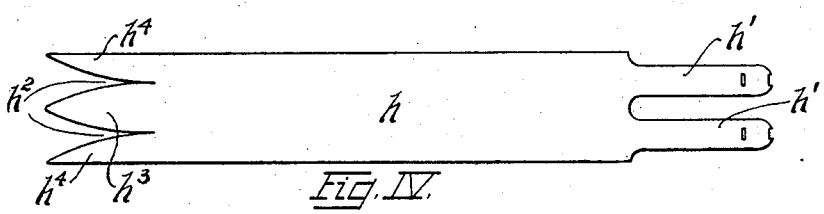
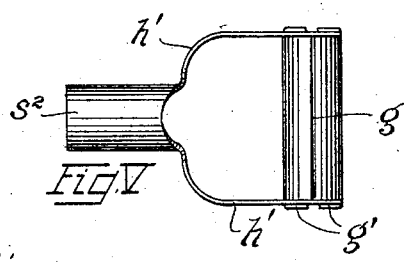
Witnesses:
F. C. Valentine
E. C. Smith
Inventor,
John C. Ross,
his Attorney.

UNITED STATES PATENT OFFICE.

JOHN C. ROSS, OF ELYRIA, OHIO, ASSIGNOR TO THE ROSS STAMPING COMPANY, OF ELYRIA, OHIO, A CORPORATION OF OHIO.

IMPLEMENT-HANDLE.

No. 869,215.            Specification of Letters Patent.           Patented Oct. 22, 1907.

Application filed February 9, 1906. Serial No. 300,261. Renewed September 25, 1907. Serial No. 394,579.

*To all whom it may concern:*

Be it known that I, JOHN C. ROSS, a citizen of the United States of America, and a resident of Elyria, in the county of Lorain and State of Ohio, have invented certain new and useful Improvements in Implement-Handles, of which the following is a specification.

My invention relates to improvements in implement handles, and has for its object the manufacture of an article of this class, which is at once cheap, simple to construct and durable.

In the annexed specification, I have described this invention in connection with an improvement in all-steel shovels. The handle of my invention, which may be used upon shovels, spades or other implements, is formed from an integral stamping, preferably of sheet steel, given a tubular shape below and laterally flared or expanded upwardly to form side-pieces, between which a suitable grip, preferably formed of a tubular sheet metal member having ears for engaging and staying said side-pieces, is adapted to be inserted to complete the device.

The shovel of my invention, comprises a blade or scoop, preferably of heavy gage steel to which is welded an all-steel handle-portion of tubular form, embracing the blade above and below, to form a rigid and secure support for said blade. These parts are formed from two separate blanks and the latter may be made of a lighter gage, low-grade steel, in order to cheapen the product.

The grip or handle proper may be of the well-known turned-wood type, but preferably I form the grip or handle-part of a tubular-portion stamped out of an additional blank, which has overlapping ears for securing the tubular-member in position within the side portions of the handle.

These and other details will be very readily gathered upon considering the annexed drawings, illustrating shovels and an all-steel handle embodying my invention, wherein;—

Figure I is a plan view of the completed shovel. Fig. II is a side view thereof. Figs. III. and IV. respectively show the blanks for forming the tubular grip and handle, and Fig. V shows the all-steel implement handle of my invention.

Throughout the several figures of the drawing, I have chosen to designate the corresponding parts by the same characters of reference, in order to avoid any confusion.

By referring first to Figs. III, IV and V, it will be seen that the blanks from which my improved shovel may be formed, are very simple to manufacture. The shovel blade $s$ preferably is of relatively heavy sheet-steel, while the handle-portion $h$ may be of lighter gage low-grade steel, since in the completed shovel, this part is given a tubular form and accordingly is stronger for the weight of steel used. The blank for the handle-portion, Fig. IV, has at its upper end side-pieces $h'$, suitably recessed and slotted to receive the ears $g'$ of the tubular grip or handle $g$. The lower portion of the handle blank is cut-away or indented at $h^2$, so that when it is given tubular form, upper and lower reinforcing members $h^3$ $h^4$ are formed for welding upon the shovel blade or scoop, which is inserted within the slot $h^2$, formed in the manner shown. These members reinforce the blade throughout their engagement therewith and being welded to said blade, form a strong, integral, all-steel shovel. The rear seam on the tubular handle may be brazed, if desired, to strengthen it. After outwardly bowing or shaping the side pieces $h'$, the grip or handle $g$ is inserted therebetween and the ears or lugs are bent over to secure said grip firmly in place. This construction serves to bind together the side pieces, and securely retain the grip or handle proper upon the shovel.

It is obvious that the handle alone Fig. V, having a socket $s^2$, may be constructed in like manner for mounting upon wooden handle-parts, and my invention embraces this particular type of handle, as well.

I claim as my invention, the following

1. In a metallic handle for implements, the combination with an integral blank shaped to provide a socket and side pieces for the handle, of a tubular member disposed transversely within said side pieces and having exterior overlapping ears at the sides of said side pieces for securing the parts firmly together and holding the tubular member in place, substantially as set forth.

2. In an all-steel implement handle, the combination with the side pieces thereof terminating in an integral tubular member, of a grip transversely disposed between the upper ends of said side pieces, and provided with exterior overlapping ears bent down upon the side pieces and securely holding the parts together, substantially as set forth.

3. In an implement handle, the combination with a handle-structure formed of an integral stamping shaped below to present a tubular form having a rear seam and substantially flat side-pieces continuing the same and outwardly bent to receive the hand of the user, and a transverse grip secured between the extremities of said side-pieces and provided with over-lapping lugs, substantially as set forth.

4. In an implement handle, the combination with a handle-structure formed of an integral stamping shaped below to present a tubular form having a rear seam, and substantially flat side-pieces recessed, and a tubular sheet metal member transversely positioned between said side-pieces and provided with overlapping ears engaging the recessed side-pieces and securely uniting the handle members, substantially as set forth.

Signed at Cleveland, this eighth day of February, 1906, in the presence of two subscribing witnesses.

JOHN C. ROSS.

Witnesses:
    ERNEST C. SMITH,
    ALBERT LYON LAWRENCE.